MAGNETIC CHAIN MEMORY

Filed Dec. 23, 1963 2 Sheets-Sheet 1

INVENTORS
JOHN L. ANDERSON
HANS-OTTO G. LEILICH
DAVID H. REDFIELD

BY

Carl C. Kling
ATTORNEY

United States Patent Office 3,371,327
Patented Feb. 27, 1968

3,371,327

MAGNETIC CHAIN MEMORY

John L. Anderson and Hans-Otto G. Leilich, Poughkeepsie, and David H. Redfield, Wappingers Falls, N.Y., assignors to International Business Machines Corporation, New York, N.Y., a corporation of New York Filed Dec. 23, 1963, Ser. No. 332,746
5 Claims. (Cl. 340—174)

ABSTRACT OF THE DISCLOSURE

A magnetic storage device for a data processing system. The storage device has a strip of conductive material having a series of apertures that define storage locations. Because the strips are usually narrowed in the region between the apertures they somewhat resemble a chain and this device is called a chain memory. The conductive strips are coated with a magnetic material to form magnetic paths around the apertures and also around the conductors that form the sides of the apertures. The material is magnetized in one direction or the other around the aperture to represent data. During a read operation a current in the apertured conductor switches the magnetization toward the direction around the conductors that form the sides of the aperture. A bit-sense wire is positioned through the aperture to sense signals produced during a read operation. The bit-sense wire is energizable in a selected polarity to establish the selected direction of magnetization for a write operation.

The disclosure also teaches different pulse patterns for reading and writing in the memory, and structural features for taking advantage of the magnetic configuration provided by the conductor and the magnetic coating on the conductor.

This invention relates to a magnetic strip memory device, and more particularly to a "chain" storage device in the form of conductive strips of apertured configuration coated with magnetic material and operable in an orthogonal mode.

Magnetic strip memory devices are described in copending patent applications as follows:

(A) Application of J.C. Sagnis, Jr., M. Teig and R. L. Ward, "Non-Destrictive Readout Magnetic Memory," Ser. No. 224,415, filed Sept. 18, 1962.

(B) Application of J. C. Sagnis, Jr., and P. S. Stuckert, "Magnetic Strip Memory," Ser. No. 255,479, filed Feb. 1, 1963.

(C) Application of H. O. Leilich, Ser. No. 332,588, "Magnetic Memory Apparatus," to be filed on even date with this application.

Copending patent applications (A) and (B) disclose a magnetic strip memory element in the form of a *solid* strip of conductive magnetic material of apertured configuration and one operated in the orthogonal mode. Because of the chain-like configuration, this type of memory device has come to be called the "chain store," and the magnetic strip to be called the "chain."

Chains of solid magnetic material according to copending applications (A) and (B) above, have required drive currents of carefully controlled characteristics and have provided output signals which, while usable, were not as large as desired. Because the magnetic material has a measurable impedance, the number of bit storage elements in a chain of solid magnetic material is limited by the changes in drive voltage and current characteristics along its strip length caused by this impedance.

CHARACTERISTICS OF THE INVENTION

*Objects*

The principal object of the invention is to improve the chain storage device.

A more particular object is to improve the output signal characteristics of the bit storage elements in a chain storage device, by taking advantage of the properties of magnetic film rather than those of bulk magnetic material.

Another object is to provide a bit storage element for a chain storage device with an optimum physical configuration for magnetic flux retention, structural strength, and compactness.

Another object is to provide a configuration for the array of bit storage elements of a chain storage device, which configuration achieves high packaging density with optimum transmission properties of word and bit conductors and low drive requirements.

Another object is to increase the number of bit storage elements which may be connected in a single chain, by reducing the electrical impedance of the chain.

Another object is to provide a configuration for a chain, which configuration minimizes mechanical stresses in the magnetic material.

*Features*

A feature of the invention is the arrangement of a non-magnetic conductor in an apertured configuration and the coating of magnetic material about this non-magnetic conductor to provide a chain of bit storage elements.

Another feature of the invention is an optimum magnetic configuration for a bit storage element of a magnetic strip memory, in which configuration closed flux paths are provided for both the word and bit flux.

Another feature of the invention is a packaging technique in which the chains (magnetically coated apertured strips) are mounted on similarly apertured insulated conductive plates in such fashion that they have minimum electrical interaction.

Another feature of the invention is the provision of a bend in a magnetic strip of bit storage elements, which bend acts as a stress relief to allow the magnetic coating to remain substantially unstressed on the surfaces of the non-magnetic conductive strip.

*Advantages*

The underlying non-magnetic conductive strip, with its low impedance, and the resulting optimum magnetic configuration allow the magnetic strip storage device to operate on drive currents without stringent control requirements, or to operate in drive modes other than sinusoidal.

Another advantage of the invention is structural strength and durability of the magnetic strip of bit storage elements.

The foregoing and other objects, features and advantages of the invention will be apparent from the following more particular description of a preferred embodiment of the invention as illustrated in the accompanying drawings.

*Drawings*

Figure 1:
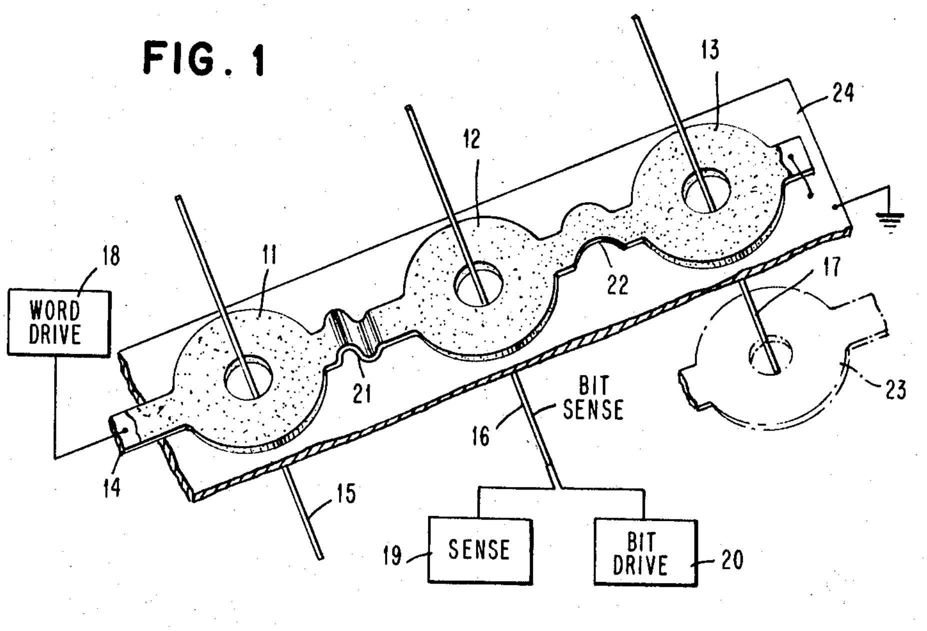
FIGURE 1 is an isometric diagram of a chain storage device according to the invention.

*Summary of the invention—FIGURE 1*

The invention is an improved magnetic strip storage device, the improvement being the use of an apertured conductive strip coated with magnetic material rather than an apertured strip of solid magnetic material. Bit storage elements 11, 12, 13 are areas of magnetic material coated on all surfaces of conductive strip 14, about central apertures, through which pass bit sense conductor means 15, 16, 17. Bends 21–22 relieve stresses in strip 14.

In the read operation, word current on conductive strip 14 from word drive means 18 rotates by 90° the magnetic vector (average direction of magnetism) of bit storage elements 11, 12, 13, providing output signals via respective bit sense conductor means 15, 16, 17 to sense amplifier means such as 19.

In the write operation, word current on conductive strip 14 sufficiently lowers the switching threshold of bit storage elements 11, 12, 13 so that the polarity of relatively small currents via bit sense conductor means 15, 16, 17 from bit drive means such as 20 control the magnetic vectors upon termination of the word current.

Figure 2:
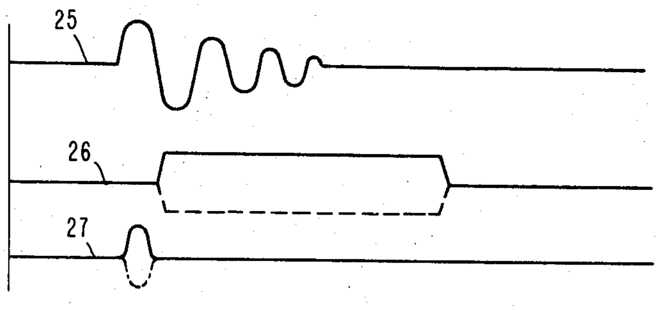
FIGURE 2 is a waveform chart for operation of the invention in sinusoidal mode.
Figure 3:
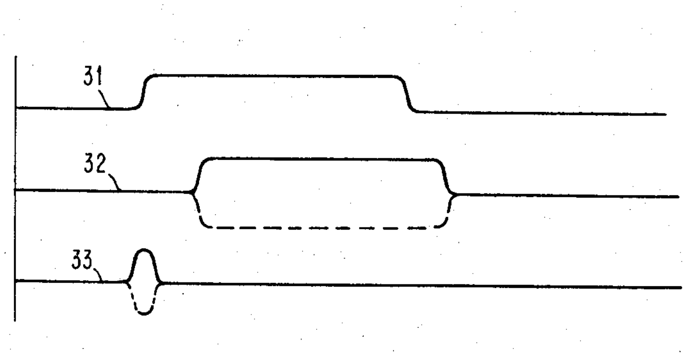
FIGURE 3 is a waveform chart for operation of the invention in unipolar mode.

*Construction and electrical operation—FIGS. 1, 2, 3*

The chain storage device according to the invention is made up of a number of bit storage elements such as 11, 12, 13 arranged about the length of a conductive strip 14 which may be of copper. Bit storage elements 11, 12, 13 are each formed by coating all surfaces of conductor 14 with a relatively thin layer of a magnetic material. This coating may be by an electroless plating technique described in U.S. patent application of A. F. Schmeckenbecher, entitled "Electroless Plating of Magnetic Material," Ser. No. 162,897, filed Dec. 28, 1961, and now abandoned. The preferred magnetic material is 81–19% nickel-iron, near the zero magnetostriction alloy composition, although black films as iron rich as 35% are acceptable.

The preferred thickness of magnetic material for bit storage elements 11, 12, 13 is 20,000 Angstroms, although a range of 5,000 Angstroms to 50,000 Angstroms is acceptable. Thicknesses over 50,000 Angstroms are subject to bulk material problems such as eddy current damping.

The dimensions of the chain itself are preferably the following:

Thickness of conductor 14 is 3 mils (.003 inch)
Width of conductor 14 between bit storage element is 6 mils.
Outside diameter of bit storage element is 20 mils.
Inside diameter of bit storage element is 12 mils.
Spacing between adjacent bit storage elements on the same strip is 25 mils.

Bit sense conductor means 15, 16, 17 pass through the central apertures of each of the bit storage elements 11, 12, 13 repsectively. The bit sense conductor means may be a single conductor as shown or may be individual bit and sense conductors depending upon the type of connections to be made. Economy suggests a common bit sense conductor as shown; performance advantage generally can be achieved by having separate bit conductors and sense conductors. The copper conductive strip 14 provides a high conductance current path for word currents which are applied at one end of the chain as shown by the arrow. Such word currents pass directly through conductive strip 14 and induce magnetic flux according to the general rules of electromagnetism in the areas directly surrounding the conductor strip itself. This area corresponds to the area upon which the magnetic material is deposited. The word current recombines as it passes the aperture of the bit storage element, connects via a neck (single strip) to the next bit storage element and again divides. As will be pointed out later in connection with FIGURE 4, this word current dividing in the two legs of each of the bit storage elements provides the field which is orthogonal to that of the current in the bit conductors. This orthogonal field reduces the switching threshold of the affected bit storage elements so that the bit current field can switch the bit storage element.

In an operative memory embodying the invention, there are many word chains each having an identical number of bit storage elements. Bit storage element 23 illustrates the placement of an additional chain. Each bit sense means affects the related bit storage element in each of many chains but is effective to switch the bit storage element only in that chain which has also been subjected to a word current to reduce its switching threshold.

The neck portions of conductor strip 14, which connect the adjacent bit storage elements, are sometimes formed in a bend to relieve stress due to expansion of the copper strip. This bend may be three dimensional as shown at reference 21 or it may remain in the same plane as shown at reference character 22. Unrelieved stresses might possibly alter the magnetic properties of the bit storage elements or might even cause structural separation of the magnetic material from the conductor. The magnetically coated conductive strip terminates in a ground plane 24.

In operation according to the sinusoidal mode of FIGURE 2, word drive circuit 18 applies a damped alternating sine wave in the word direction on the conductive strip 14 both read and write. The leading edge of the damped wave reads data by inducing output pulses on the bit sense conductor. These output pulses are sensed by sense amplifiers such as 19. The later portion of the damped sine wave, in coincidence with bit pulses on the bit sense conductors, writes data into the individual bit storage elements.

In operation according to the unipolar mode, as shown in FIGURE 3, unipolar direct current pulse is applied at one end of conductor 14 of the selected chain. This pulse divides in the two legs of each of the bit storage elements and recombines in the neck between adjacent bit storage elements before dividing for the next bit storage element. The leading edge of the word pulse, the magnetic effect of which rotates the magnetic vector of the appropriate bit storage element to a direction essentially at right angles to the direction of the word conductor generally, and diametric to the bit storage element itself, causes rotation of the magnetic vector of the bit storage element which induces in the appropriate bit conductor an electrical transient of polarity indicative of the bit value. This mode of operation is the subject of U.S. patent application Ser. No. 332,588 of H. O. Leilich, "Magnetic Memory Apparatus," mentioned above.

Figure 4:
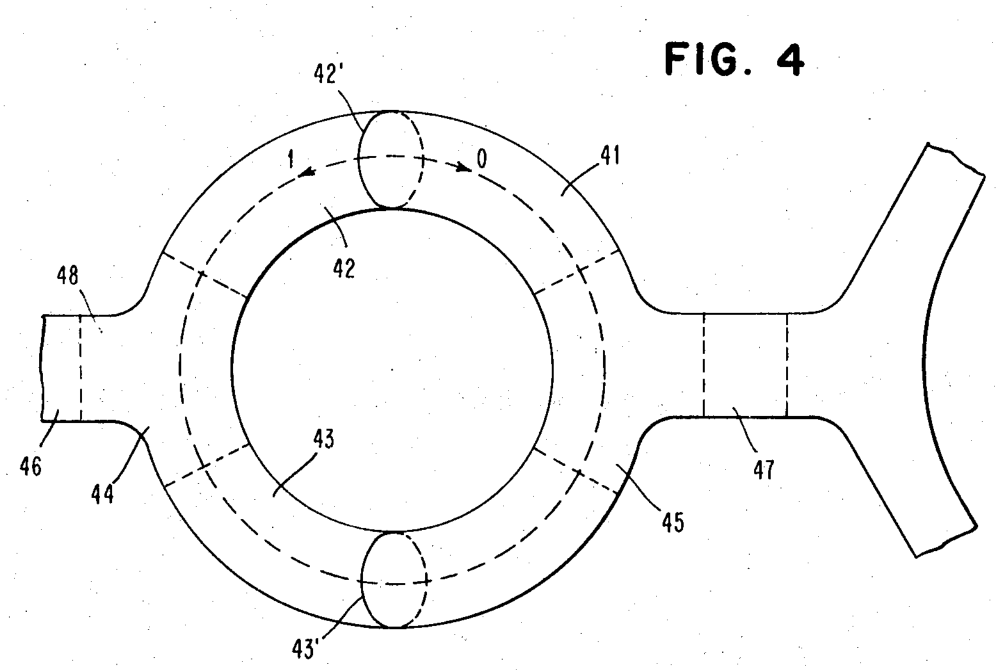
FIGURE 4 is an operation diagram for use in explaining the characteristics of the invention.

*Magnetic operation—FIGURE 4*

The bit storage elements of the invention are such that there is a closed magnetic path for bit flux and a closed magnetic path for word flux. These paths are illustrated in FIGURE 4. Bit flux path 41 extends in a circular fashion about the central aperture. Word flux path 42' extends about one leg 42 and word flux path 43' extends about the other leg 43.

As to the closed bit flux path 41, there is no external demagnetization. There is no limitation of film thickness except of eddy currents. There is large signal flux to drive flux relation, and full utilization of bit current, which provides disturb stability. Any shape anisotropy effects in the bit direction are such as to increase the bit stability of the bit storage element. There is no bit flux linked with space outside of the bit storage element and there is thus no interaction of bit storage elements. Accordingly, the element to element spacing is not sensitive to information patterns in the array and there are no bit fluxes trapped in the external conductors. The closed word flux paths 42' and 43' provide no path for external demagnetization and thus there are no lost ampere turns in the drive. There is no word flux linked with space outside the device. This configuration provides low sensitivity to external and adjacent bit storage element fields and thus allows a high packaging density.

In memory arrays, it is advantageous to have uniform characteristics of all the bit storage elements so that drive current characteristics and sense amplifier characteristics can be optimized. In batch fabricated memories such as the chain, the requirement of uniform characteristics becomes more stringent because individual bit storage elements cannot effectively be replaced. The configuration shown is uniform over each of the two legs 42–43 which form the main storage surfaces. There are two branching areas 44–45 at the points where the bit storage element is connected by the relatively small necks 46–47 to the adjacent bit storage elements. The neck itself does not play any significant part in the bit storage function of the device. The neck would advantageously be unplated but it is not generally necessary to prevent or remove plating from the neck. The magnetic material in the branching areas 44–45 and on the necks 46–47, where the word drive fields and bit fields may be distorted, burdens the performance or adds to the word or bit line inductance. The percentage of magnetic material in these areas is rather small, about 30% as compared with the relatively large 70% of the main storage surface. It is advantageous for the necks to be free of magnetic material.

Figure 5:
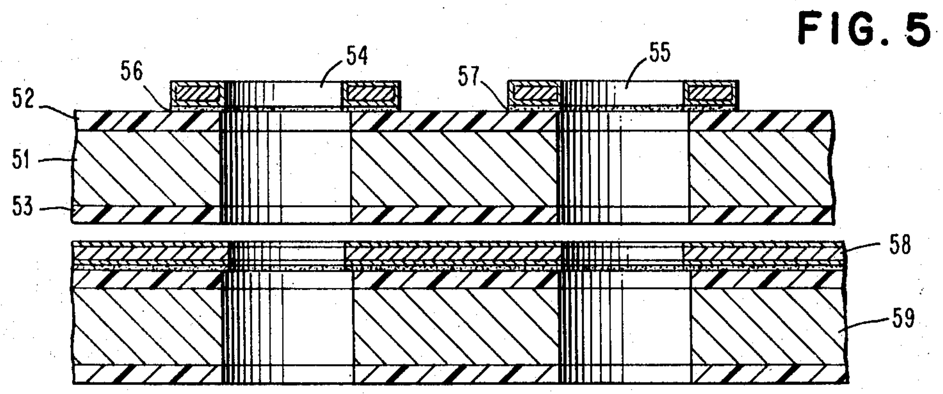
FIGURE 5 is a section view, greatly enlarged, of a small portion of a chain storage device.

*Actual construction—FIGURE 5*

An actual memory according to the invention comprises several planes each carrying a plurality of chains, and suitable switching logic to select individual chains. In general, each chain represents a word. A suitable plane might have 128 word chains each of 128 bits for a total of 16,384 bits per plane. FIGURE 5 shows a small section of one plane. The plane is essentially a polished copper ground plane 51 which is covered on both surfaces by an insulation layer 52–53. The insulation layers may advantageously be 1 mil inch thick layers of a dielectric such as polyester film. Each chain 54–55 is cemented to the insulated ground plane 51 by a thin layer of non-shrinking silicone rubber 56–57.

The direction of the chains in adjacent planes of the stack is at right angles as shown in FIGURE 5, where chain 58 on insulated ground plane 59 is at right angles to chains 54 and 55. This arrangement of word lines which are adjacent in space provides minimum interconnection between such chains and also allows the diodes which are used for selection to be placed on alternate sides of alternate planes to improve packaging density.

*Read-only memory*

The chain storage device has been described as an operating read-write memory. It can also be operated as a read-only memory by the following technique:

Provide identical bit currents to all devices of the array in the form of a bias toward one or the other of the bit storage values, i.e., bias toward 1.

During original construction of the device, selectively break or etch away one leg only of each of those bit storage elements which are desired to provide the zero value. This removal alters the closed bit flux path and thereby distinctly alters the output characteristics of the appropriate bit storage element. The broken bit storage element might, however, produce a low level output. It is therefore advantageous if the sense amplifiers be of the threshold type.

Figure 6:
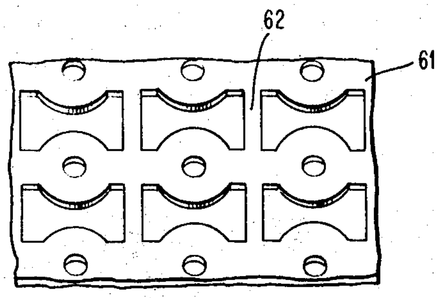
FIGURE 6 is a view of a base for a completely plated chain storage device according to the invention.

*Completely plated construction—FIGURE 6*

The entire chain storage device can be plated by using an injection molded plastic or etched glass substrate 61 which is essentially in the form of the desired chain configuration, plating this with copper, etching away undesired copper, plating the resulting configuration with nickel-iron, and making etxernal connections. Areas 62 between chains may be etched away if desired.

*Orientation*

The magnetic material used in each chain storage element may be either anisotropic or isotropic, that is either oriented or non-oriented. If anisotropic magnetic material is to be used, the appropriate anisotropy may be introduced during the original deposition of the magnetic material by the use of a direct current on a wire passed through the central aperture in the general fashion of the bit sense conductor. The magnetic material may be deposited upon the chain by known techniques of electroless plating or electroplating or other suitable techniques.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory device comprising:
(a) a plurality of non-magnetic conductive strips of configurations including at intervals certain areas each defining a central aperture;
(b) a coating of magnetic material covering all surfaces of said areas defining central apertures, whereupon each said area is definable as a bit storage area;
(c) means for producing an electrical drive current, connected at a first position along the length of a selected one of said plurality of non-magnetic conductive strips;
(d) bit-sense conductor means passing through the central apertures of said bit storage areas; and
(e) means connected to said bit-sense conductor means to provide selective bit drive currents and to sense output signals.

2. A memory matrix according to claim 1 wherein each of said plurality of conductive strips has relatively small neck portions connecting adjacent bit storage areas and has at least one of said neck portions formed in a bend to reduce stress.

3. A magnetic memory device according to claim 1 wherein said word drive conductor means is a conductive metal strip and wherein said magnetic coating has a thickness in the range 5,000–50,000 Angstroms.

4. A magnetic memory according to claim 3 having in addition a dielectric coated conductive substrate having holes arranged with dimensions similar to those of the central apertures of said bit storage areas, upon which substrate said plurality of magnetically coated conductive strips are arranged so that the central apertures of said bit storage areas register with the holes in said substrate.

5. A magnetic memory according to claim 4 wherein said dielectric coated conductive substrate is ohmically connected to said plurality of conductive strips at a second position, remote from said first position, along the length of said selected one of said plurality of non-magnetic conductive strips, to serve as a return path for drive currents.

References Cited

UNITED STATES PATENTS

| | | | |
|---|---|---|---|
| 3,264,619 | 8/1966 | Riseman et al. | 340—174 |
| 3,192,512 | 7/1965 | Korkowski | 340—174 |
| 3,161,946 | 12/1964 | Birkenbeil | 340—174 |
| 3,166,681 | 1/1965 | Strong | 340—174 |

FOREIGN PATENTS

| | | |
|---|---|---|
| 581,225 | 10/1946 | Great Britain. |

TERRELL W. FEARS, *Primary Examiner.*

JAMES W. MOFFITT, *Examiner.*

Disclaimer 3,371,327.—*John L. Anderson* and *Hans-Otto G. Leilich*, Poughkeepsie, and *David H. Redfield*, Wappingers Falls, N.Y. MAGNETIC CHAIN MEMORY. Patent dated Feb. 27, 1968. Disclaimer filed May 5, 1970, by the assignee, *International Business Machines Corporation.*

Hereby enters this disclaimer to claim 1 of said patent.

[*Official Gazette August 25, 1970.*]